US011611729B2

(12) United States Patent
Eder et al.

(10) Patent No.: US 11,611,729 B2
(45) Date of Patent: Mar. 21, 2023

(54) DISPLAY METHOD, APPARATUS AND SYSTEM

(71) Applicant: Sony Interactive Entertainment Inc., Tokyo (JP)

(72) Inventors: Michael Eder, London (GB); Fabio Cappello, London (GB); Robert Keith John Withey, Biggleswade (GB); Nicola Penny Ann Cavalla, Kidlington (GB); Hsinpei Yang, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 527 days.

(21) Appl. No.: 16/745,538

(22) Filed: Jan. 17, 2020

(65) Prior Publication Data

US 2020/0236330 A1 Jul. 23, 2020

(30) Foreign Application Priority Data

Jan. 22, 2019 (GB) ..................................... 1900857

(51) Int. Cl.
*H04N 9/31* (2006.01)
*G03B 21/606* (2014.01)
*G06F 1/16* (2006.01)

(52) U.S. Cl.
CPC ......... *H04N 9/3152* (2013.01); *G03B 21/606* (2013.01); *G06F 1/169* (2013.01)

(58) Field of Classification Search
CPC ...... H04N 9/31–3197; G03B 21/00–64; G06F 1/00–3296
See application file for complete search history.

(56) References Cited

U.S. PATENT DOCUMENTS

| 2004/0135744 A1 | 7/2004 | Bimber |
| 2011/0037952 A1 | 2/2011 | Laduke |
| 2017/0322513 A1* | 11/2017 | Zapanta ................... G02B 5/32 |
| 2020/0234618 A1 | 7/2020 | Eder |

FOREIGN PATENT DOCUMENTS

| WO | 2002015110 A1 | 2/2002 |
| WO | 2009091365 A1 | 7/2009 |
| WO | 2017196399 A1 | 11/2017 |

OTHER PUBLICATIONS

Extended European Search Report for corresponding Application No. EP 19213464.1, 11 pages, dated May 20, 2020.
Kuan Luo, et al., "Pepper's Cone: An Inexpensive Do-It-Yourself 3D Display" ACM, 11 pages, Oct. 22-25, 2017.

(Continued)

*Primary Examiner* — Bao-Luan Q Le
*Assistant Examiner* — Christopher A Lamb, II
(74) *Attorney, Agent, or Firm* — Matthew B. Dernier, Esq.

(57) ABSTRACT

A display system for use in a Pepper's Ghost illusion includes a light emissive display, a sensor operable to detect the position of an attachment member of a cone, relative to the light emissive display, and a positioning processor operable to position images, which have been distorted by an inverse of the distortion caused by the reflection of the cone, responsive to the detected position of the cone relative to the light emissive display.

12 Claims, 9 Drawing Sheets

(56) References Cited

OTHER PUBLICATIONS

Kuan Luo, et al., "Pepper's Cone: An Inexpensive Do-It-Yourself 3D Display" YouTube, URL:https://www.youtube.com/watch?v=dppCXj11l_Q, 1 page, Dec. 14, 2017.
Combined Search and Examination Report for corresponding Application No. GB1900856, 4 pages, dated Jul. 1, 2019.
Extended European Search Report for corresponding Application No. EP 19211439.5, 11 pages, dated May 20, 2020.
Anonymous: "Hologram Mobile Phone" URL:https://www.alibaba.com/showroom/hologram-mobile-phone.html, 7 pages, Jan. 10, 2013.
Examination Report for corresponding Application No. GB1900856.4, 4 pages, dated Oct. 18, 2021.
Examination Report for corresponding Application No. GB1900857.4, 4 pages, dated Oct. 18, 2021.
Communication Pursuant to Article 94(3) for corresponding Application No. EP 19213464.1.5, 10 pages, dated Nov. 30, 2021.
Communication Pursuant to Article 94(3) for related Application No. EP 19211439.5, 10 pages, dated Nov. 30, 2021.
Examination Report for corresponding Application No. GB1900856.4, 3 pages, dated Apr. 27, 2021.
Examination Report for corresponding Application No. GB1900857.2, 3 pages, dated Apr. 27, 2021.
Combined Search and Examination Report for corresponding Application No. GB1900857.2, 2 pages, dated Jun. 28, 2019.

\* cited by examiner

DISPLAY METHOD, APPARATUS AND SYSTEM

BACKGROUND OF THE INVENTION

Field of the Invention

The present invention relates to a display method, apparatus and system.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Modern display devices, such as TVs, tables and phones, have continued to improve in terms of resolution, contrast, and angle of view, and also in terms of providing alternative viewing modes such as active, passive or auto-stereoscopy, or dual-view techniques.

However, there is still scope to extend the available alternative viewing modes further.

The present invention aims to address or mitigate this need.

SUMMARY OF THE INVENTION

It is to be understood that both the foregoing general description of the invention and the following detailed description are exemplary, but are not restrictive, of the invention.

In a first aspect, a display system is provided in accordance with claim 1.

In another aspect, a system is provided in accordance with claim 10.

In another aspect, a method of adjusting a display system for use in a Pepper's Ghost illusion is provided in accordance with claim 12.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

A display method, apparatus and system are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1A:
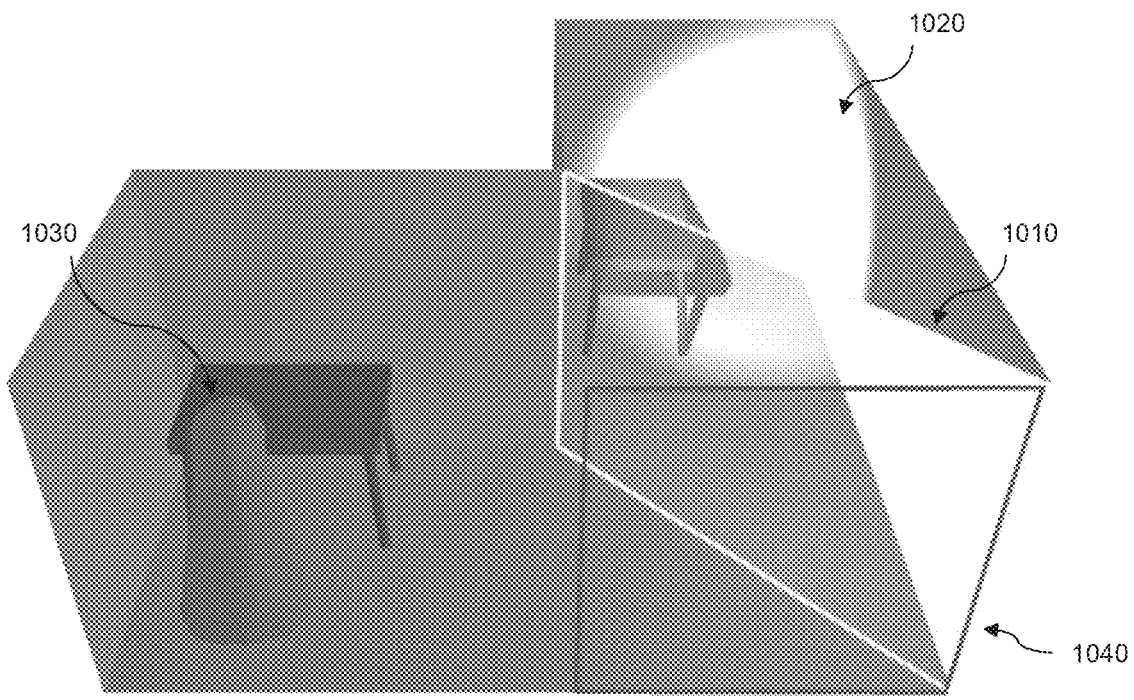
FIGS. 1A and 1B are a schematic diagram of the Pepper's ghost illusion.
Figure 1B:
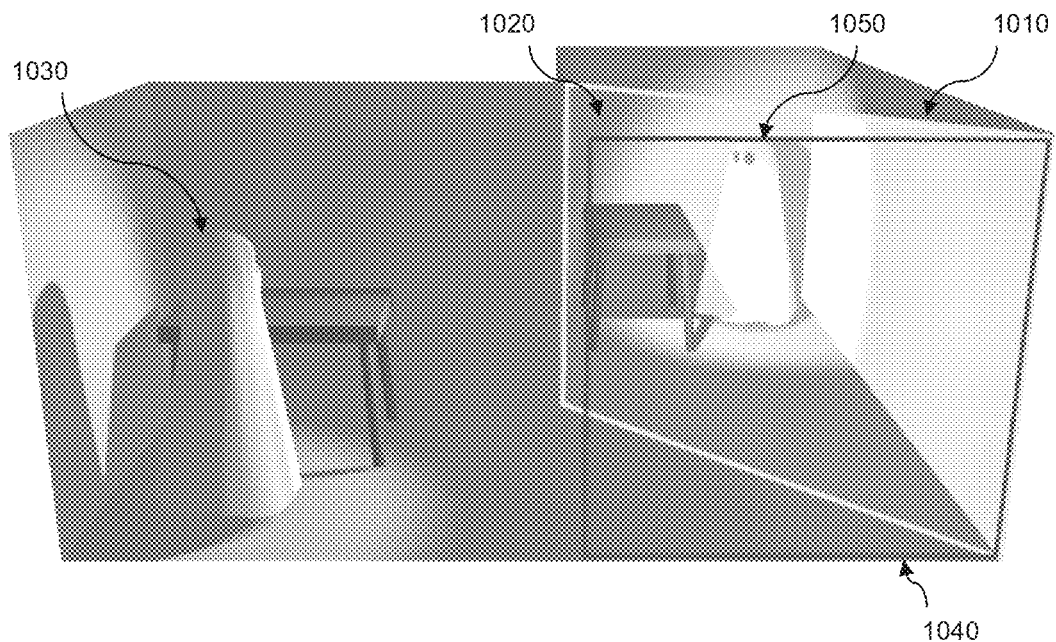

Referring now to the drawings, wherein like reference numerals designate identical or corresponding parts throughout the several views, embodiments of the present invention make use of an illusion from the Victorian era commonly referred to as 'Pepper's Ghost'. Referring to FIGS. 1A and 1B, the illusion was used to create the appearance of a ghost on stage, by placing a semi-reflective panel (e.g. a sheet of glass or, now, plastic) 1010 within the set on stage 1020, at an angle that reflected a concealed actor 1030 towards the audience (viewing through the stage front 1040); In FIG. 1B, when the actor was illuminated on cue, their reflection 1050 appeared in the panel within the set, giving the illusion of a ghost appearing. By contrast, the table next to the concealed actor in these figures would be redundant, as it would simply be superposed over the existing corresponding table on stage.

Furthermore, the brighter the illumination of the concealed actor relative to the set on stage, then generally the more solid the ghost appears.

It will be appreciated that rather than illuminating a concealed actor, a concealed self-illuminating image source such as a projector or television showing the actor (or any desired image) may be reflected by the panel to similar effect.

This combination of a self-illuminating image source and a semi-reflective panel may be used outside the original theatrical context to create the Pepper's Ghost illusion in other contexts where the integration of the ghost within a set is not necessary.

Figure 2:
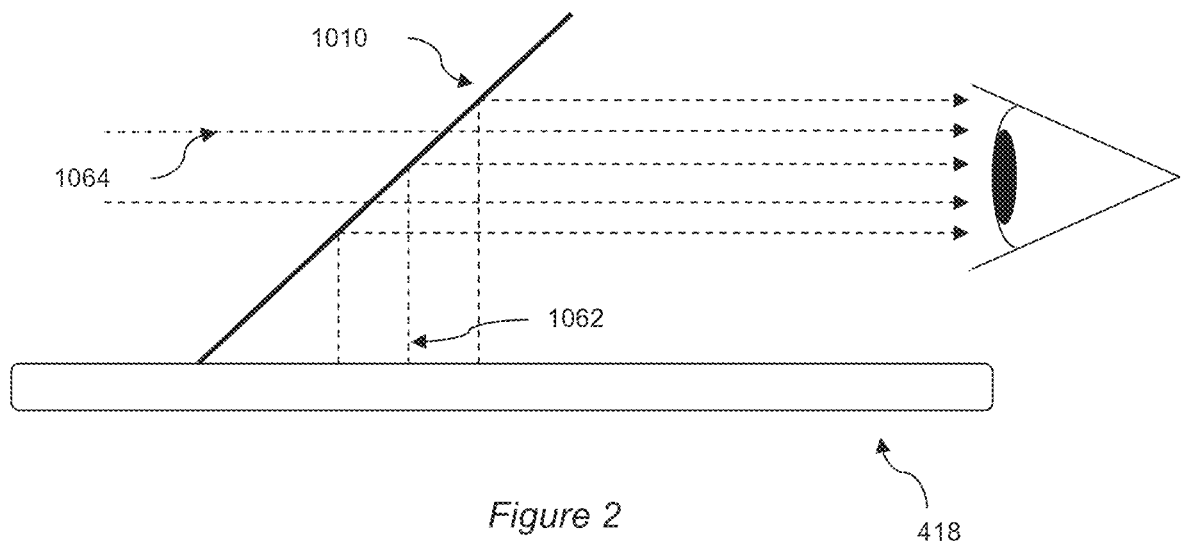
FIG. 2 is a schematic diagram of a semitransparent reflector on a light emissive display.

Hence referring to FIG. 2, a light-emissive display 418 (such as a TV, tablet, phone, or smartwatch) may have a semi-reflective panel 1010 (of suitable size) attached to it so that a user can view the ghost effect.

Light 1062 from an image on the display is partially reflected by the panel towards the user, whilst light 1064 from the environment is partially transmitted through the panel towards the user, creating a blended image. Again, the ghost will appear more solid if it is comparatively brighter with respect to the environment, and so the effect is particularly strong in low ambient light levels.

It will be appreciated that the illusion only works if the user is in approximately the correct position, for example as indicated by the eye in FIG. 2, looking at the display from one edge. If the user was looking along any of the other three edges of the display device (or indeed from above) then they would not see the illusion properly.

To address this, one may consider placing a respective panel facing each edge, with a respective version of the source image of the ghost included on the display, to great four versions of the ghost illusion. To provide equal space on the display for each source image, the panels would ideally converge on the center of the display, and hence form an inverted pyramid.

However, whilst this may be adequate for some use cases (for example if a display panel was placed at a location where people's approach to it from one or more directions is predicable), such as in a concourse, intersection, shop or building entrance or the like, it may be unsatisfactory particularly for users of portable light-emissive displays (such as tablets, smartphones and smartwatches), which can typically be held and viewed from arbitrary angles. Whilst a user may naturally co-operate with the panels to achieve the desired illusion, this is restrictive and prone to distortion if not correctly aligned by the user.

Cone Reflector

Figure 3:
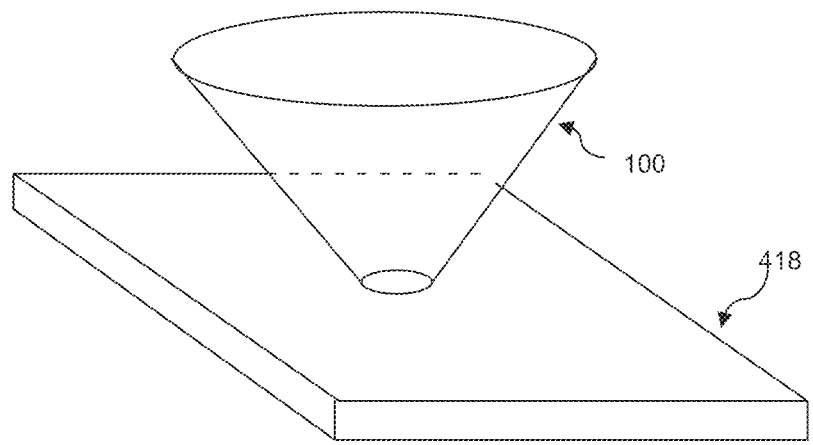
FIG. 3 is a schematic diagram of a semi-reflective cone, on a light emissive display, in accordance with embodiments of the present invention.

Accordingly, in an embodiment of the present invention, with reference to FIG. 3 a conical semi-reflective panel 100 is provided for removable attachment to a light-emissive display 418. The conical semi-reflective panel 100 is intended to provide a single ghost image to a user (although in principle two or more users could view a respective ghost image—whether the same or different—if that image could be accommodated on the display at the same time, as will be described later herein.

Figure 4:
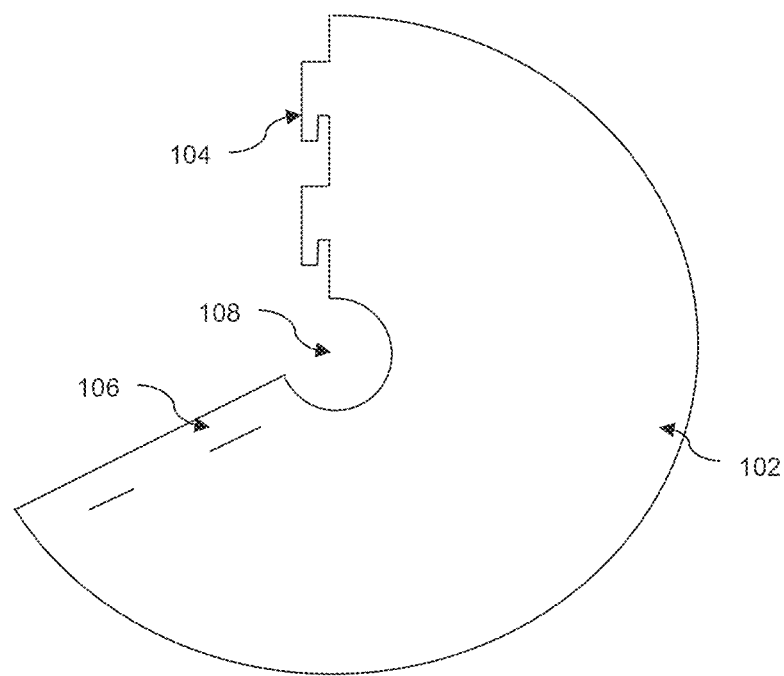
FIG. 4 is a schematic diagram of an arcuate flat plastic sheet for assembly into a cone, in accordance with embodiments of the present invention.

Referring to FIG. 4, in an embodiment of the present invention the cone may be constructed from a flat arcuate sheet 102, for example made of plastic, with one or more tabs 104 and slots 106 or other disengagable engaging means (other examples including corresponding adhesion surfaces, hook-and-loop fastening surfaces, or the like) at the two ends of the sheet, to enable easy assembly and flat storage. Alternatively, the sheet of plastic could be rolled up and stored, for example in a corresponding tubular container (not shown).

The flat arcuate sheet of plastic is arranged to form a cone with a predetermined cone angle when assembled. The cone angle may typically be 90 degrees, so that the angle of the cone relative to the display is 45 degrees. However, a narrower or broader cone may be considered, for several reasons. Firstly, a narrower cone angle can produce more height in the resulting ghost illusion for coverage of an equivalent region of the display, if this is desired (for example, depending on the preferred use of the illusion). Meanwhile, a wider cone may provide more comfortable viewing for a user, since the user will be looking at an apparently solid object at arms length that is in fact a 'flat' image (as discussed later herein) and hence does not produce the expected image disparities of a genuine object viewed at such a distance from two viewpoints separated by typical inter-ocular distances. Hence the cone angle may in fact be 95, 100, 105, or 110 degrees, or any angle in-between, such as 101, 102, 103 or 104 degrees.

Figure 5:
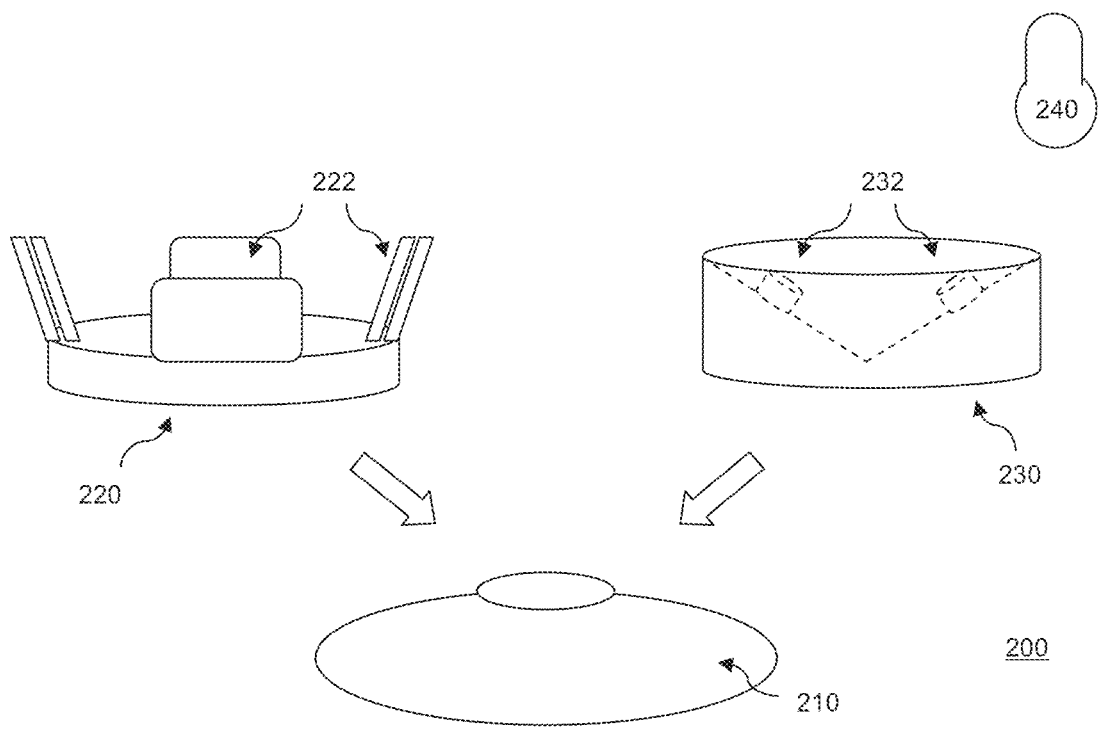
FIG. 5 is a schematic diagram of an attachment member, in accordance with embodiments of the present invention.

It will be appreciated that the flat sheet as shown in FIG. 4 results in a truncated cone due to the central cut-our region or void 108; if the flat sheet did not have a central void 108, but rather the ends of the sheets comprising the tabs and slots met at the center, then it would produce a full cone. However, for the purposes of the present invention, a full or partially truncated cone can be treated as equivalent and both may be referred to as a 'cone' unless specifically distinguished herein Referring now to FIG. 5, in an embodiment of the present invention the cone may comprise an attachment member 200, or where the cone is assembled, this attachment member may be provided to accept the assembled cone.

The attachment member 200 is intended to keep the cone in a fixed position on top of the display.

Accordingly, in an embodiment of the present invention, the attachment member 200 has a sucker 210 on its lower surface, and a cone retention arrangement 220, 230 on its upper surface. The cone retention arrangement 220 for a truncated cone may comprise one or more slots 222 adapted to receive the truncated tip of the cone. One or more of these slots (or at least part thereof, such as the inner portion of such a slot) may be flexible to allow for the cone to be inserted. Hence for example the cone retention arrangement 220 may be made of the same material as the sucker, and be integral with it. Optionally for example this material may be a conductive silicone, similar to the material used for a smartphone stylus, and typically transparent.

The cone retention arrangement 230 for a full (pointed) cone be comprise a receiver of corresponding shape, and one or more studs 232 that fit corresponding holes in the cone (not shown). If the studs 232 are flexible, then one or more may optionally be made mushroomoid to further assist with retention, whilst still allowing the cone to be removable. Hence again the cone retention arrangement 230 may be made of the same material as the sucker, and be integral with it. In this case, the holes themselves may be non-circular to assist with engagement with the mushroomoid studs, for example as shown in the insert 240 in FIG. 5; the mushroom may enter the larger radius portion of the hole, before the cone moves down further into the cone retention arrangement, causing the mushroom to slide into the smaller radius portion and hence become engaged with the cone.

If the cone is provided with a tubular container for storage, then optionally the cone retention arrangement may also act as the lid or plug for the container, for example with the sucker remaining external to the tube, where it can be used to pull the lid or plug out when access is desired, and optionally to affix the tube to a desired surface for storage.

Display

Figure 6:
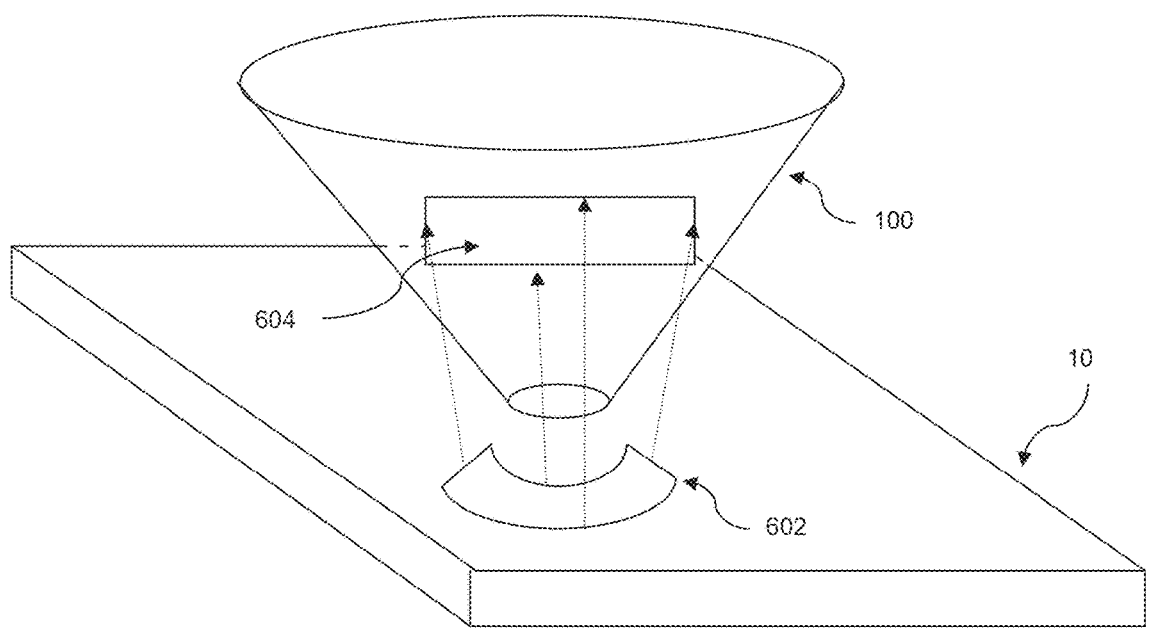
FIG. 6 a schematic diagram of a display system displaying an image which has been distorted by an inverse of the distortion caused by the reflection of the cone, in accordance with embodiments of the present invention.

Referring now to FIG. 6, which shows a display system comprising a cone as described herein and a light emissive display such as a TV, tablet, phone or watch, it will be appreciated that unlike a flat semi-reflective panel, the conical panel described herein will generate a distorted image due to its curvature. Furthermore, this distortion will vary with height as the radius of the cone changes (and hence the subtended angle per reflected pixel changes). It will be appreciated that this variation in distortion with height occurs in Cartesian coordinates (such as those used to address pixels of the display) but not in radial coordinates.

However, the geometry of a cone with a particular cone angle is well understood, and so the resulting reflection distortions can be calculated and inversed, to pre-inverse-distort the image presented on the display so that the distorted image in the cone looks correct to the viewer.

Hence in FIG. 6, a pre-inverse-distorted rectangle 602 is shown, showing for example curvature of the rectangle greater in the lower part than the upper part due to the corresponding change in distortion with height on the cone (although clearly the radial extent of the rectangle is the same at top and bottom). This image is then subsequently distorted in an opposite manner (indicated by the dotted arrows) within the reflection of the cone to produce the appearance of an apparently correct rectangle 604.

Hence the light-emissive display calculates (or obtains, for example from a remote computer or pre-recorded source) pre-inverse-distorted images to show on the display.

The eye interprets the object (e.g. the rectangle) as being located within the cone, because the reflection appears flat rather than following the curvature of the cone itself and showing the expected distortion caused by this.

The result is a pleasing hologram illusion, in which displayed objects appear to exist within the volume of the cone.

Applications for this illusion include providing users with pop-up avatars for people calling them or interacting on social media—many people already use their phones for calls by holding them roughly horizontally in front of their mouths, and so the presence of the cone would not be inhibitory.

Similarly, pop-up graphics for other uses can be envisaged, such as to view collections of in-game characters, or treasure or trophies, or for an interactive board game, a user's selected in-game avatar would be used to indicate to other players who they are. Similarly the user's own face could be used to turn the phone itself into a token representing its user.

Other uses can be considered for when a phone might otherwise be inconveniently positioned edge-on the user; for example, the cone could be used to provide sat-nav instructions if placed on a dashboard, or display the time if placed on a bedside table.

It will be appreciated that other effects may be obtained, for example by displaying a inverse-distorted image that substantially surrounds the cone, so that multiple users perceive reflections from the front and rear of the cone at the same time.

Hence in summary, a method of displaying a Pepper's Ghost illusion may comprise positioning a cone 100 of semi-reflective material onto a light emissive display, and displaying on the light emissive display an image that has been distorted by an inverse of a distortion caused by a reflection of the cone.

Placement

Referring again to FIG. 6, it will be appreciated that if the inverse-distorted image of the rectangle is in the wrong position relative to the cone, then the resulting reflection will not appear correct because the inverse distortion assumes a specific reflection path that is ultimately relative to the centerline of the cone.

Accordingly, identifying the position of the cone on the display device is important for providing the best result.

In an embodiment of the present invention, the display may operate under suitable software instruction to display a reticule or target, for example at the center of the display, upon which to place/affix the cone.

The display may then passively assume that the cone is positioned correctly, and generate distorted images accordingly.

However, for some users (e.g. children) and for some use cases (e.g. for an alarm clock activated by putting the cone on a phone), the user may be less accurate or not fully understand the requirement, resulting in a poor illusion. For children in particular, who may not understand the underling principles of the system, this may be frustrating.

Therefore, in an embodiment of the present invention, whilst a reticule or target may still be displayed, the display device comprises a touch sensitive surface (for example such as the touch screen of a tablet or phone). The touch sensitive surface can then detect contact by an object of known size, such as the sucker of the attachment member, and calculate the central position of the cone. It will be appreciated that the sucker may not perfectly contact the touch sensitive surface all around its circumference, but a central position can still be estimated by measuring a plurality of diagonals across the contact surface and finding two that are the same (or to within a small tolerance such as 0.1, 0.5 or 1 mm, or to within the separation pitch of the touch sensitivity of the surface) and are also the largest, indicative of being the maximum extent of the diameter of the sucker, and finding the point of intersection. To further improve this estimate, same/similar and maximal diagonals close to orthogonal are preferred and so where multiple candidates exist, those closest to orthogonal may be chosen preferentially. Of course, more than two diagonals may be used to identify the center, ignoring any outlier values that contradict a majority or threshold number of other intersections, which should all be within a small tolerance such as again 0.1, 0.5 or 1 mm, but potentially more for larger screens. Hence more generally the positional error tolerance may be measured as a percentage of the screen size, for example being in the order of 1-5%. It will be appreciated that for non-circular suckers or other attachment means (for example, magnetic), then the appropriate expected dimensions to the above diagonal can be similarly used.

Hence in summary, the display device (e.g. a processor of the device) is operable to estimate a centroid of the attachment member responsive to touch surface signals when the attachment member is in contact with the touch surface. This offset between this centroid and the default or intended position (e.g. the true center of the display and/or displayed target) can then be used for the displayed images.

For smart watches, not all devices have a touch screen, but in any event, the small size of the screen means firstly that the positional tolerance required for placement of the cone may be too small for a user to reliably or easily place the cone on the display, but also an attachment member comprising a sucker of sufficient size to reliably hold the cone would likely obscure most of the display.

Accordingly, in an embodiment of the present invention, the attachment member comprises a clip-on shell that fits over some or all of the smart watch. For example, respective attachment members may be designed to fit popular brands of smart watch, for example using the main button on the watch like an attachment stud or post and having a corresponding hole, and then clipping over the opposite side of the watch.

Figures 7A, 7B:
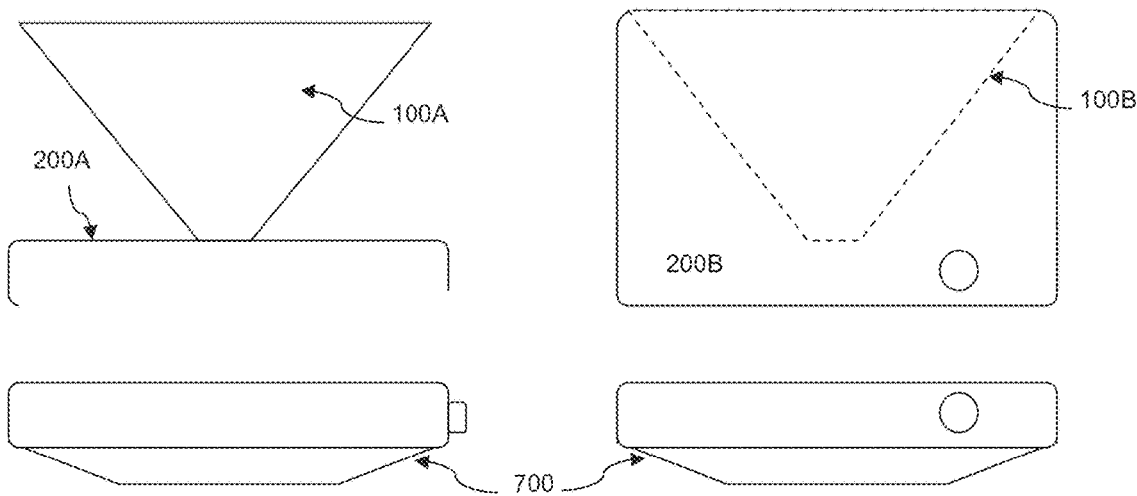
FIGS. 7A and 7B are schematic diagrams of a clip on arrangement for a cone, in accordance with embodiments of the present invention.

FIGS. 7A and 7B show a watch 700 (without wrist straps for clarity) from two sides, and above it a cone 100A, 100B and integral attachment member 200A, 200B.

In FIG. 7A, the attachment member 200A attaches to the tip of the inverted cone 100A, and the attachment member clips around the watch body, optionally having one or more holes to accommodate one or more buttons, and then lies substantially flush to the bezel of the watch.

In FIG. 7B, as an alternative the attachment member 200B attaches to the base of the inverted cone 100B, and forms a box or cylinder around the cone that then clips around the watch body, optionally having one or more holes to accommodate one or more buttons (visible in FIG. 7B). The formation of the box or cylinder provides some additional protection for the cone, which may be made of thinner material when made for a watch.

Figure 8A:
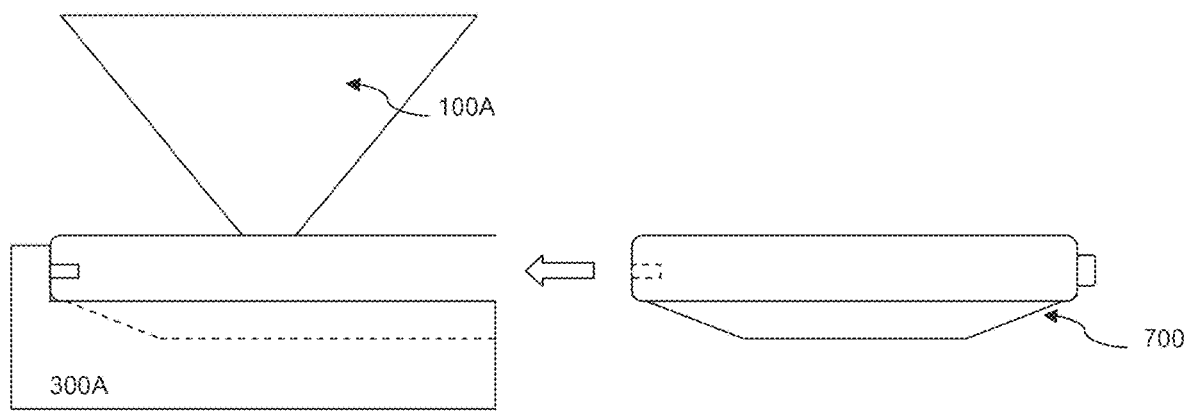
FIGS. 8A and 8B are schematic diagrams of a charging or docking station comprising a cone, in accordance with embodiments of the present invention.
Figure 8B:
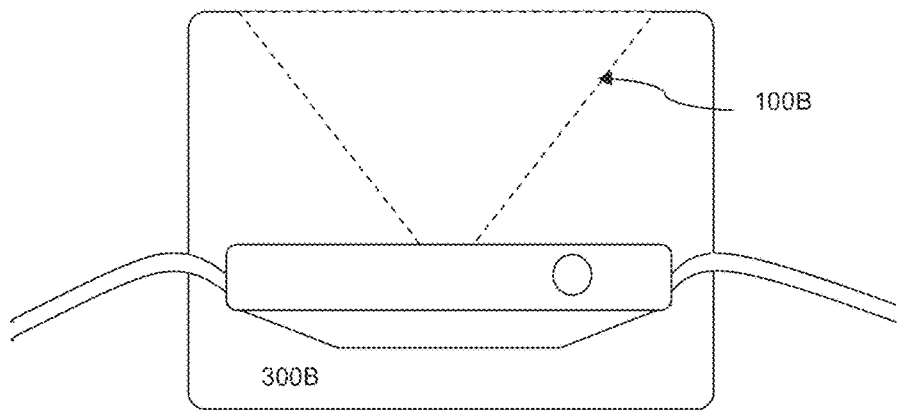

Referring also to FIGS. 8A and 8B, a similar approach may be used for a docking/charging station for a watch (or indeed any portable device, such as a phone or tablet); because the position of the charging connector(s) on a particular device are known, the relative position for the cone over the center of the device display can also be determined, and the docking/charging station designed accordingly.

FIG. 8A illustrates a docking station 300A for a watch that implements a similar arrangement for the cone to the clip-on scheme of FIG. 7A. In this case the charging connector is illustrated as a plug/socket arrangement, but may for example be two contacts on a lower surface of the watch.

FIG. 8B illustrates a docking station 300B for a watch that implements a similar arrangement for the cone to the clip-on scheme of FIG. 7B. In this case the charging connector is not shown.

It will be appreciated that such a docking station may be useful for a bedside table or similar, enabling the watch to display the time, weather, caller ID or other information to a user despite the watch itself facing upwards and hence being edge-on to the user.

Finally, it will be appreciated that the clip-on arrangement of either 7A or 7B may be accommodated by a docking/charging station so that a user may clip the cone on to the watch (or a similar clip-or arrangement may be provided for a known phone or tablet) for use prior to placing the device on its station, and may similarly remove the device from its station with the cone on for a period of time before removing it, for example to pocket the device or wear it with long sleeve clothing.

Figure 9A:
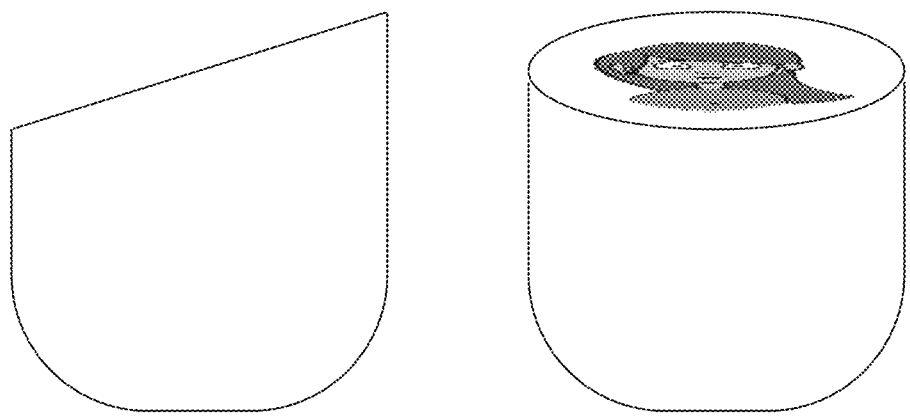
FIGS. 9A and 9B respectively illustrate a home assistant and the home assistant in a charging or docking station comprising a cone, in accordance with embodiments of the present invention.

Again similarly either the clip-on approach or the docking station approach can be used for other devices, such as voice-activated home assistants, where these have displays. Hence for example FIG. 9A shows an example of such an assistant showing an image of a person relevant to an enquiry by a user, or indicating a diary entry, text or phone call to the user, etc. however as will be appreciated from FIG. 9A, this image may be not always easy to see.

Figure 9B:
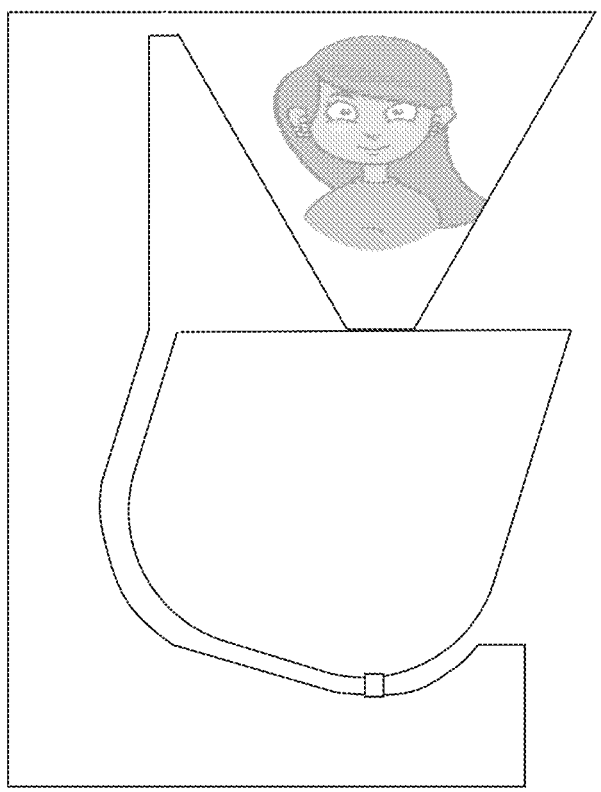

Hence a clip-on cone, or as shown in FIG. 9B a docking station with an electrical connection having a predetermined physical relationship with the centre of the device display may be provided that enables the assistant to display the image reflected in the cone. It would also be appreciated that where a device has a notional front side, such as the device in FIG. 9 then the clip-on cone or docking station may also have a notional front side and hence may only use a partial cone, such as a 180° semi-cone, or similarly a 210, 270 or other angle partial cone (or potentially a 90° cone, for a corner mounted device).

Consequently, in the case of any one of the arrangements of FIG. 7A, 7B, 8A 8B, or 9B, the attachment member may comprise a portion that corresponds in shape to a part of the device having a known position relative to the intended location of the cone on the display (e.g. the point of attachment, and/or electrical contact), so that fitting at least that portion of the attachment member to the device (or vice versa) places the cone in a known and desired position relative to the display.

Put another way, the attachment member may be a unit (such as a docking station) that corresponds in shape to a part of the display system and engages with the display system in a predetermined manner that places the cone in an intended location over the display.

It will be appreciated that whilst the clip-on or docking embodiments may also use a touchscreen-based detection of the cone, alternatively or in addition the known physical relationship between the clip-on cone or the dock/charger cone and the screen mean that the position of the cone may be safely assumed as long as the clip-on cone or the act of docking or charging is detected.

Consequently embodiments of the present invention, the display system 400 comprises a physical engagement detector other than the touch surface (e.g. other than the touchscreen). In one instance, this may be a recessed button, or electrical contact or other sensor that is activated or otherwise changed its state when the clip-on cone, charger or docking station is engaged with the display system. For example, the clip-on cone, charger or docking station may complete electrical contact between two electrodes located on one side of the device, or may engage with a recessed switch in a slot of the device corresponding to a tab on the clip-on cone, charger or docking station.

Similarly, the physical engagement detector may be logical; for example if the display system begins to receive charge, it may assume that it is properly engaged with the charge or docking station without any further physical check being made. Optionally, the display system may handshake with the charge or docking station to confirm that it is of a type equipped with a cone before switching to a mode that presents a display suitable for reflection by the cone.

Figure 10:
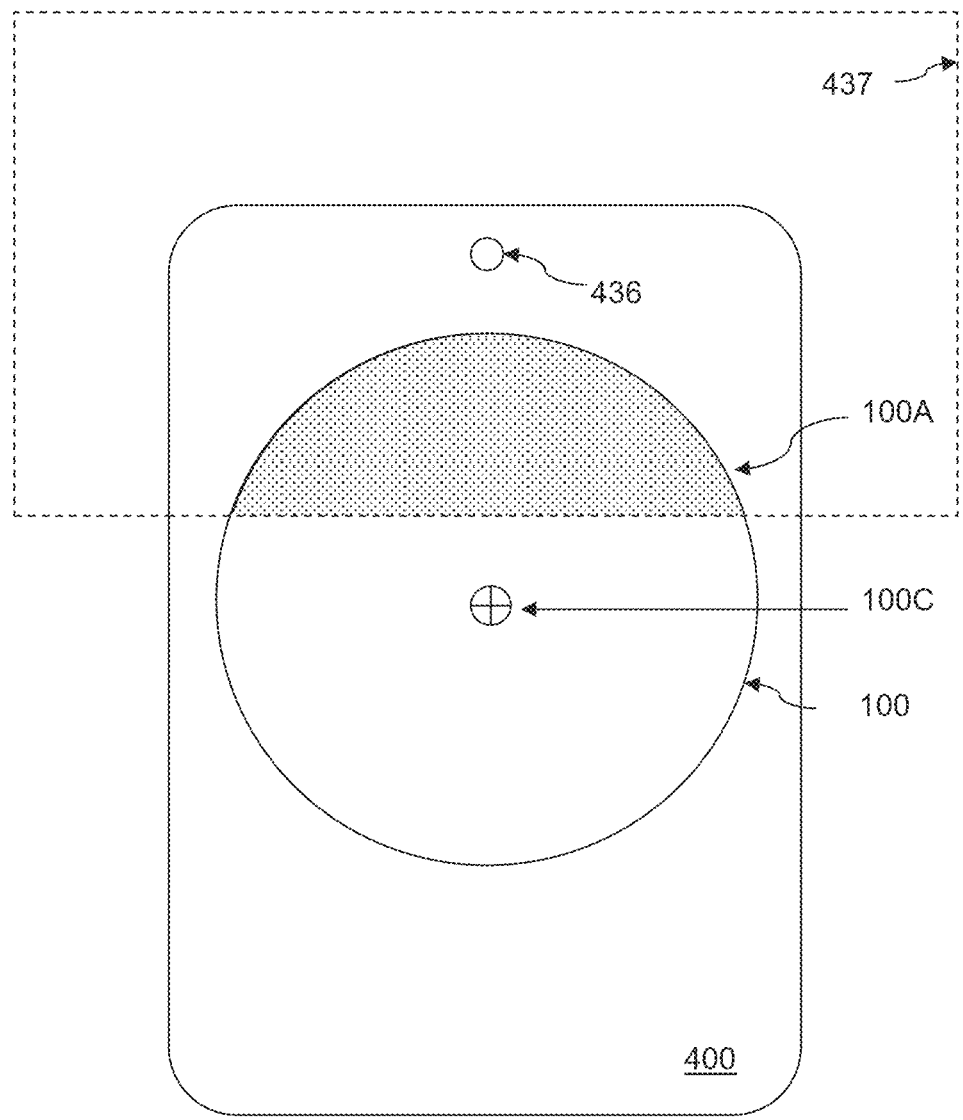
FIG. 10 is a schematic diagram of a display system comprising a camera, and a cone, in accordance with embodiments of the present invention.

Referring now to FIG. 10, alternatively or in addition, a camera 436 of the display device 400, if present and facing in the same direction as the display 418, may be used to detect at least part of the cone.

Where the camera has a known physical relationship to the display (for example because both are integral to the same device), then for a cone of known dimensions, the position and amount of the cone that appears within an image captured by the camera will allow for a calculation of the position of the cone with respect to the camera, and hence also with respect to the display.

Hence in FIG. 10, the camera 436 is operable to take an image with a field-of-view that extends to perimeter 437 at the height of the cone 100 when placed on the display of the display system 400.

In an image captured by the camera, a portion of the cone 100A is visible. A processor (for example of the display system) can then calculate from the visible portion of the cone where the center of the cone 100C will be in relation to the camera, and hence in relation to the display of the display system. The calculation may be achieved in multiple ways, and more than one calculation may be used to provide error checking. For example, a template corresponding to the shape cone may be compared to the captured image in order to determine a best fit, after which a center point of the template may be used. Alternatively or in addition, a radius of curvature of the visible cone may be calculated to construct a circle from which a center point can be determined. Alternatively or in addition, two or more lines normal to the edge of the cone (i.e. orthogonal to a tangent of the visible edge of the cone) may be projected inward, and their point of intersection can be used as a center point. If necessary, distortion to the image of the cone caused by known optical effect of the camera may be corrected for prior to making any of the above calculations.

Hence in summary the display device may comprise a camera (436) having a known physical relationship to the light emissive display (418), and a processor operable to estimate a center axis of the cone responsive to at least a partial image of the cone captured by the camera, for example using any of the above techniques.

Finally with regards to positioning the cone, it will be appreciated that whilst the cone itself will typically be a circular cone (or part thereof), the display will be typically rectangular (although smartwatches and home assistants may have circular displays). Furthermore, the aspect ratio of a rectangular display may vary depending on the device.

Accordingly, software used to inverse-distort images for reflection in the cone may limit the effective area of the display for this purpose to a circle centered on the cone, having a radius equivalent to the distance between the center of the cone and the closest edge of the display.

This will enable viewing of an object within the cone from any angle encircling the cone without further alteration.

Alternatively, additional graphics may be shown when reflections from a portion of the display on the long axis or more generally outside the circular area would be visible; for example, users often hold their phones longitudinally towards their mouths, so that reflections based on images in the part of the display closer to the user than the cone could be used. In such a case, if the image needed to be scaled down because the user turned the phone through 90°, it is likely that this will be a comparatively rare event and the compromise would be understood by the user.

Detection of an orientation of the phone with respect to the user will be discussed later herein.

Interaction

Figure 11:
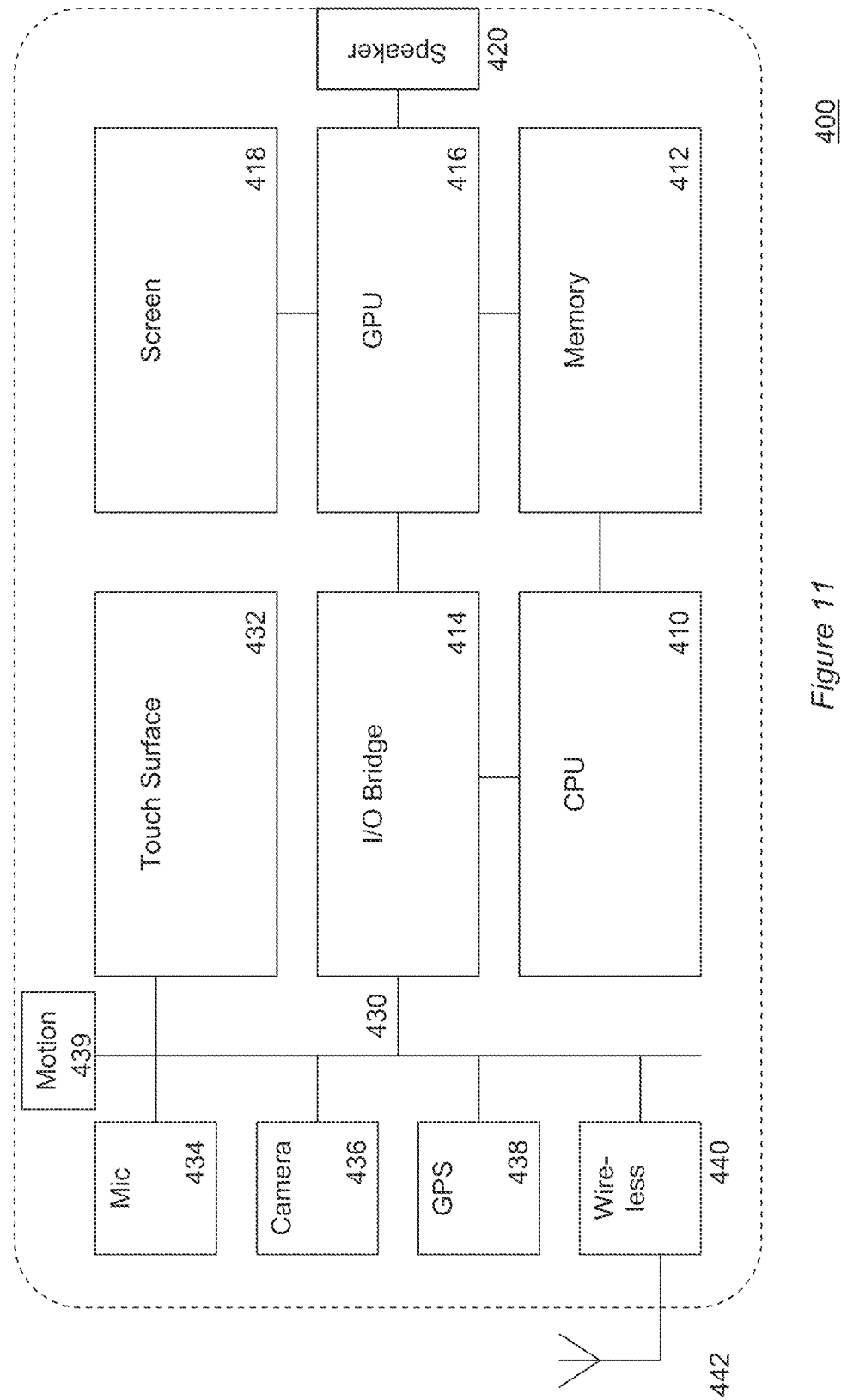
FIG. 11 is a schematic diagram of a display system in accordance with embodiments of the present invention.

FIG. 11 illustrates an exemplary-only display system 400 (in this case a smart phone). As noted elsewhere herein, equivalent display systems include TVs, tablets, smart watches, home assistants, and similar devices.

In this example, the display system 400 comprises a central processing unit (CPU) (410). The CPU may communicate with components of the display system either through direct connections or via an I/O bridge 414 and/or a bus 430 as applicable.

In the example shown in FIG. 10, the CPU communicates directly with a memory 412, which may comprise a persistent memory such as for example Flash® memory for storing an operating system and applications (apps), and volatile memory such as RAM for holding data currently in use by the CPU. Typically persistent and volatile memories are formed by physically distinct units (not shown). In addition, the memory may separately comprise plug-in memory such as a microSD card, and also subscriber information data on a subscriber information module (SIM) (not shown).

The display system may also comprise a graphics processing unit (GPU) 416. The GPU may communicate directly with the CPU or via the I/O bridge, or may be part of the CPU. The GPU may share RAM with the CPU or may have its own dedicated RAM (not shown) and is connected to the light emissive display 418 of the display system. The display is typically a liquid crystal (LCD) or organic light-emitting diode (OLED) display. Optionally the GPU may also be used to drive one or more loudspeakers 420 of the display system.

Alternatively, the speaker may be connected to the CPU via the I/O bridge and the bus. Optionally other components of the display system may be similarly connected via the bus, including a touch surface 432 such as a capacitive touch surface overlaid on the screen for the purposes of providing a touch input to the device, a microphone 434 for receiving speech from the user, one or more cameras 436 for capturing images, a global positioning system (GPS) unit 438 for obtaining an estimate of the display system's geographical position, and a wireless communication means 440. Typically the display system may also comprise a motion detection means 439 such as one or more gyroscopes and/or accelerometers.

The wireless communication means 440, if provided, may in turn comprise several separate wireless communication systems adhering to different standards and/or protocols, such as Bluetooth® (standard or low-energy variants), near field communication and/or Wi-Fi®, and also phone based communication such as 2G, 3G, 4G and/or 5G.

The display system is typically powered by a battery (not shown) that may be chargeable via a power input (not shown) that in turn may be part of a data link such as USB (not shown).

It will be appreciated that different display systems may include different features (for example a compass or a buzzer) and may omit some of those listed above (for example a phone capability).

The motion detection means 439 may be used by the display system 400 to calculate its relative position and orientation with reference to a position and orientation at a previous time. It may also be used to detect absolute properties, such as orientation with respect to gravity. This latter facility may be used for example to switch between landscape and portrait modes during conventional use of the display.

In the context of displaying reflections on the cone, when positioned over the display system, the motion detection means may detect the effective yaw of the display system; that is to say, the rotation about the z-axis normal to the display (e.g. the central axis of the cone).

Optionally, the inverse distorted image on the display may then be rotated around the axis of the cone in an opposite direction, in order to maintain reflection of the image in the same direction with respect to the wider environment as the device is rotated.

Alternatively or in addition, the optionally virtual object being displayed may be rotated responsive to the detected yaw; that is to say, either the virtual object itself or the position of a virtual camera with respect object may be rotated responsive to the detected yaw so that rotation of the display system results in a corresponding rotation of view of the virtual object. When combined with the optional counter rotation of the inverse distorted image around the axis of the cone, when the display device is rotated about the display's z-axis, the virtual object will appear to rotate within the cone whilst still reflecting in the same direction—for example towards the user.

The choice of direction itself may initially be assumed. For example, it may be assumed that the typical user will hold the display system substantially horizontally, with any primary interaction button accessible by the non-dominant hand (typically the left-hand) so that the right hand long side of the display is facing the user. The inverse distorted images may therefore be positioned so as to predominantly reflect toward the right of the device display.

Alternatively or in addition, the choice of direction may be assumed based on the current function of the device. For example, when making a phone call, it may be assumed that the typical user will hold the display system substantially horizontally with the microphone pointing towards the user's mouth, and so the inverse distorted images may therefore be positioned so as to predominantly reflect toward the bottom of the device display. In the case of phone calls, the presence of the cone makes it unlikely that the user will hold the phone to their ear, or if they do then the orientation of images presented to the cone is unlikely to be an issue during this mode of use.

Meanwhile for general material such as a game or similar, the dominant orientation of content (for example in landscape or portrait mode) is likely to determine whether the inverse distorted images are positioned to predominantly reflect toward the right of the device display or the bottom of the device display, or any other angle/direction based on the dominant orientation.

It will be appreciated however that users do not always hold devices so that a particular side of the device is perfectly parallel to their eyes, and so whilst to a first approximation the choice of direction may be assumed using any one of the techniques above, it would be preferable if the choice of direction could be more accurately determined.

In a case where a display system comprises plural microphones 434 such as in some smart phones, then the relative delay between the respective microphones receiving sound sources such as user speech during a phone call provides an indication of the relative yaw angle of the user to the device.

The microphone receiving the sound source first also indicates the direction of rotation of the display system from a true parallel pointing directly towards the sound source, where the sign of the relative yaw angle could otherwise be ambiguous.

In between utterances from the user, the motion detection means 439 can track changes in position and orientation of the display system to maintain an estimate of the relative position of the display to the user's mouth. This estimate can be updated or replaced using the microphone as new utterances from the user are heard.

In this way, the yaw direction towards the user's mouth and hence also their eyes can be initially determined from user speech and subsequently from motion detection means, in order to identify the yaw direction towards which reflections from the cone should be directed in order to present the reflections directly to the user.

Alternatively or in addition, in a case where a display system comprises a video camera 436 on the same side as the light emissive display, then a facial recognition processor may obtain sample images from the video camera to identify a nearby face. It may not be necessary to recognize the individual, but merely identify the presence of a face. Based on the size of the face within the image, optionally the distance of the individual to the camera may be estimated by the processor, which may serve to disambiguate multiple faces to identify the one within arm's length of the device if more than one face is identified. Similarly based on the position of the face within the image, the relative orientation of the individual to the camera may be calculated by the processor, and from this the yaw direction towards which reflections from the cone should be directed, in order to present the reflections directly to the user, can be determined.

Again when the user is out of view of the camera, the motion detection means can track changes of position and orientation of the display system to maintain an estimate of the relative position of the display to the user's face, and update this has new views of the user are obtained.

The camera may also be used to provide further interaction by the user with the Pepper's ghost illusion. Referring again to FIG. 10, it will be appreciated that the field of view 437 of the camera will be larger at a greater distance than the top of the cone. For example at a distance of 10-20 cm from the camera, the field of view is likely to encompass an area covering most of the screen and the cone. Consequently, if the user places a hand towards the cone or even into the cone, their hand will be captured by images from the camera.

Accordingly, an image processor may be operable to detect a hand in close proximity to the camera/display/cone, and based upon the appearance of the hand determine its approximate position relative to the cone.

The hand position may then be used to interact with one or more objects displayed using the cone, for example to pat or stroke a pet (patting and stroking themselves can be distinguished by the movements of the user's hand), or feed the pet, or to add or remove objects.

The interaction itself may be contextually determined; that is to say, the same hand movement (e.g. into the cone) may have different effects depending on what is displayed, and optionally on the state of the displayed object (e.g. if a pet is asleep, the hand may wake it; if the pet is begging, the hand may feed it, and so on).

As noted above, where movement or configuration of the hand/fingers near or within the cone can be detected or inferred from the captured image, then such movements or configurations can be used to differentiate the interaction. Hence for example, a hand with a pointed finger may be used to cause the pet to make a noise, whilst a spread hand may be used to cause the pet to stop its current activity.

Meanwhile it will also be appreciated that two hands may be detected, either both from one user, or one each from two users, for example to implement a multi-user interaction (for example a multiplayer game).

Furthermore, it will be appreciated that rather ant a hand, a videogame controller may be used as a proxy for a hand or in its own right to physically interact with the cone (for example in the space proximate to the cone). Hence for example a Sony PlayStation Move® controller may be used as a fishing rod, to catch fish being displayed within the cone. It will be appreciated that in this case, either a camera on the display device may track the illuminated sphere of the move controller relative to the virtual position of fish as calculated to be displayed in the cone, or a separate camera operably coupled to a videogame console may be used by that console to track the move controller and similarly co-ordinate the interaction with the display device, for example via a wireless link.

It will also be appreciated that the display system and cone could be used as part of a multiplayer scenario, for example where a first player wears a VR headset and the second player uses the display system and cone. In such a scenario, the player not in VR could interact with the cone so as to view for example a map of the virtual environment, and then interact with this for example so as to assist the VR player out. Hence for example the VR player could be in the maze, and the non-VR player could view the map of the maze via the cone. The non-VR player could then help direct the VR player, for example by pointing out which way to go via an interaction with the cone, or gifting/pointing out a particular item, etc displayed by the cone. The non-VR player may also for example be able to rotate the view of the map to get a better view.

Hence in summary, a non-contact sensor (microphone and/or camera) is operable to detect the location of the user, at least with respect to the relative yaw angle of the display system. Optionally a processor and a motion sensor of the display system can track the relative yaw angle of the display system to the last known position of the user when the user is not currently audible/visible.

Optional means of disambiguation for audio and image data can be employed (earliest mic signal, and largest face, respectively, as discussed previously herein).

Optionally, as discussed previously herein, the non-contact sensor, motion processor and the like can be used to correct/refine an assumed/default yaw angle. This assumed/default yaw angle may be based on an indication of screen orientation from an app or OS (e.g. portrait, landscape), or a absolute physical orientation of the display device (e.g. portrait or landscape with respect to gravity), or the current use/function/state of the display system (e.g. making a phone call).

The information about the relative yaw angle to the user may then be used either to rotate the inverse-distorted image to face the user, or to rotate the virtual object being displayed, or both. If the display system includes a camera on the same side of the system as the display/cone (whether or not it is used as part of the non-contact sensor), then optionally this may be used by a processor to detect interactions by the user with the cone, and in particular placements of a user's hand near or in the cone, and/or gestures or configurations of the user's hand corresponding to specific actions or commands. This enables one or two player interactions with the display system and cone, either in isolation or as a peripheral to a videogame console or the like.

It will also be appreciated that other modes of interaction are still possible, such as spoken commands, physical interaction with the display device (for example with a touchscreen interface shown in a region outside the notional area of the screen being used to generate reflections in the cone, or with physical buttons of the display device), or via wireless signals from a remote device such as a videogames console, which may transmit inputs, commands, and/or state information responsive to the state of an application such as a game on the console, and/or responsive to inputs provided by a user to that console, for example using a videogame handheld controller.

It will be appreciated that the above discussion of determining a relative yaw angle in which to send reflections to the user assumes a single image and a notional 'front side' for the image. However it will be appreciated that images may surround the cone to provide multiple reflections in different directions. For example, inverse distorted images of fish may be animated to show them swimming around inside the cone as if it were a fish bowl.

In this case, the images do not occupy a notional front side of the cone, but rather move within a notional volume of the cone. However, to provide the illusion that the fish are moving within the volume, the volume itself must maintain a notional front side (or more generally a notional orientation) consistent with physical movements of the display system.

Hence more generally, determining a relative yaw angle in which to send reflections to the user encompasses determining a relative yaw angle offset for the or each image being displayed around the center axis of the cone.

Meanwhile, where several people are looking at the cone from the same side, but adjacent to each other so that their viewpoints are not identical, then whilst the inverse distortion discussed herein may be used, optionally an inverse distortion for a averaged position between the users, or based on a reflection to encompass the wider distance between separate user's viewpoints, may be calculated. This scenario may be detected for example by a camera on the display device or a remote camera encompassing the scene of the display device and the two or more users.

Variations

Whilst a conventional (full or truncated) round cone is a particularly convenient reflector for the Pepper's ghost illusion, due to the ability to assemble one from a flat sheet, it will be appreciated that the term 'cone' can also encompass vertically curved structures such as paraboloids and ellipsoids. Hence a 'cone' can be optionally considered to encompass one or more of the classes of a round cone and a vertically curved dome.

In each case the appropriate inverse-distortion would be calculated for the cone or dome.

It will be appreciated that a dome in particular may be useful for a smartwatch display or home assistant, either when clipped on or as part of a docking station. It will also be appreciated that in principle a partial cone or dome may be used for any device that may occupy a fixed or predetermined place in the environment that inherently limits the range of views of the user, such as against a wall or in a corner, and hence half or quarter cones or domes may also be considered within the scope of the invention. For brevity, all these variants can be considered to fall under the category of a cone, although it will be appreciated that specific reference to a full cone, truncated cone, dome or other arrangement may be taken to specifically refer to that arrangement.

As noted previously herein, a cone can be made from a arcuate flat plastic sheet, for example made from PETG (Polyethylene Terephthalate Glycol). The thickness of the sheet representative trade-off between strength and flexibility. Consequently depending on the use, the sheet may be 1.5 mm thick, 1.0 mm thick, or 0.5 mm thick, or any appropriate thickness above, within or below this range. Optionally the size of the cone may be chosen so that the corresponding arcuate flat plastic sheet can fit inside a videogame box (typically corresponding in size to a Blu-ray® box), either on one side of the box (roughly equal to 120 mm×150 mm available space), or spanning both halves of the box and bending as the box opens or closes (roughly equal to 240 mm×150 mm available space). The sheet could also be positioned on the outside of the plastic part of the videogame box, but inside the cover sleeve identifying the box contents, and this may still be considered to be inside the videogame box, when taking the packaging as a whole.

Clearly for preformed cones, such as may be found in a clip-on or docking station implementation, flexibility may be less important, and other plastics may be considered.

Several applications for the purpose ghost illusion have been noted herein, including caller ID and a virtual pet. Other applications include use as a 3D viewer of objects (for example to preview a 3D print of a videogame character); a trophy viewer for viewing virtual trophies, or more generally for viewing other collections, such as captured animals, treasure or other loot; customising an in-game character or more generally a user avatar, whether for use in games or for example for videoconferencing, caller ID or other social network applications; a holographic assistant (for example providing a face to accompany the voice response of a home personal assistant); a videoconferencing avatar, whether computer-generated or captured video of the correspondent (mono- or stereoscopic); one or more components of the user interface, where the main screen is separate to the display system (for example be a television connected to a videogame console that is also in communication with the display system); a sound to light display for music played by the display system (optionally comprising a waveguide from one or more speakers of the display system to the tip of the cone, enabling it to act as a passive amplifier); and use for other display system platforms than TV, tablet, phone, laptop, smartwatch, and/or home assistant, such as providing a virtual head for a robot (for example using a dome implementation as described previously herein).

Software and Hardware

It will be appreciated that the methods described herein, for example regarding inverse distortion of an image for conical reflection and display of such an image on the display system, detecting the attachment or engagement of a cone or an assembly comprising a cone to the display system, for example using a touch surface, camera or physical engagement detector, and where appropriate detecting or assuming the position of the cone on the display and modifying the position of the display image accordingly, limiting or using portions of the light emitted display according to the position of the cone and/or the orientation of the display device either in absolute terms or with respect to the user, and/or modifying the displayed image responsive to a relative yaw angle of the user with respect to the display system, where this may be detected by a noncontact sensor such as a camera or pair of microphones, and/or any other the other methods and techniques described herein, may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Summary Embodiments

In a summary embodiment of the present invention, as described previously herein a display system (400) (such as for example a TV, laptop, tablet, phone, smartwatch, home assistant or other suitable device), for use in a Pepper's Ghost illusion, comprises a light emissive display (418); a sensor (432, 436) operable to detect the position of an attachment member (200) of a cone (100), relative to the light emissive display; and a positioning processor (such as CPU 410 operating under suitable software instruction) arranged to position images, which have been distorted by an inverse of the distortion caused by the reflection of the cone, responsive to the detected position of the cone relative to the light emissive display.

In an instance of this summary embodiment, the display system is adapted to display a target on the light emissive display prior to positioning of the attachment member on the light emissive display.

In an instance of this summary embodiment, the attachment member is of a known size, and the sensor comprises a touch surface (432) on the light emissive display (418).

In this case, optionally the positioning processor is operable to estimate a centroid of the attachment member responsive to touch surface signals when the attachment member is in contact with the touch surface.

In an instance of this summary embodiment, the sensor comprises a camera (436) having a known physical relationship to the light emissive display (418).

In this case, optionally the positioning processor is operable to estimate a center axis of the cone responsive to at least a partial image of the cone captured by the camera.

In an instance of this summary embodiment, the sensor comprises a physical engagement detector other than a touch surface (which as described previously herein may for example comprise a physical switch, or may be a logical handshake, or a combination of the two).

In an instance of this summary embodiment, an area of the light emissive display used to display images for reflection by the cone is limited to a circle centered on the cone having a radius equivalent to the distance between the center of the cone and the closest edge of the display.

In an instance of this summary embodiment, an area of the light emitted display being the part of the display on the longitudinal axis that is closer to a user than the cone is used to display images for reflection.

In an instance of this summary embodiment, as described elsewhere herein, the display system (400) and a cone (100), comprising a conical wall of semi-reflective material, may cooperate to form a system for use in a Pepper's Ghost illusion.

In this case, optionally the cone comprises an attachment member (200) for removably attaching the cone to the surface of a light emissive display (418)

Alternatively in this case, optionally the cone comprises an attachment member (200) that corresponds in shape to a part of the display system and engages with the display system in a predetermined manner that places the cone in an intended location over the display.

Figure 12:
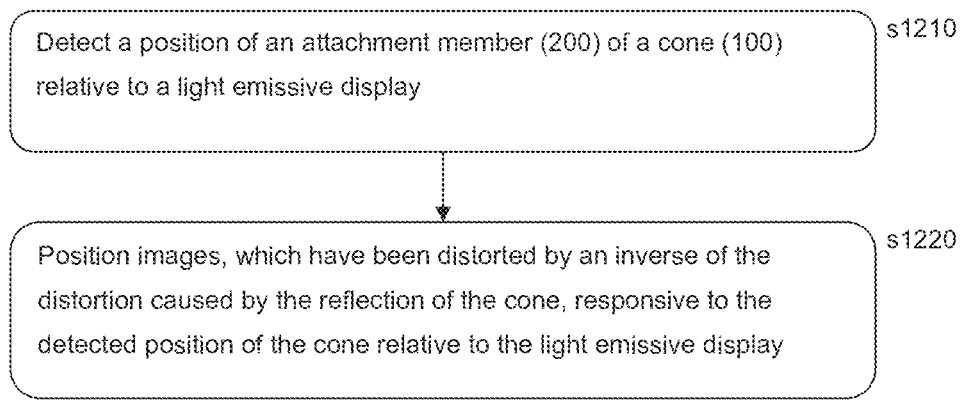
FIG. 12 is a flow diagram of a method of adjusting a display system for use in a Pepper's Ghost illusion, in accordance with embodiments of the present invention.

Referring now to FIG. 12, in another summary embodiment of the present invention, a method of adjusting a display system for use in a Pepper's Ghost illusion comprises:

in a first step S1210, detecting a position of an attachment member (200) of a cone (100) relative to a light emissive display; and in a second step S1220, positioning images, which have been distorted by an inverse of the distortion caused by the reflection of the cone, responsive to the detected position of the cone relative to the light emissive display.

In an instance of this summary embodiment, the step of detecting the position comprises using a sensor operable to detect the position of the attachment member, relative to the light emissive display, in which the sensor comprises one or more from the list consisting of:

i. a touch surface on the light emissive display;

ii. a camera having a known physical relationship to the light emissive display; and iii. a physical engagement detector other than a touch surface.

Similarly, in instance of this summary embodiment a computer readable medium may comprise computer executable instructions adapted to cause a computer system to perform the methods therein.

It will also be apparent to a person skilled in the art that variations in the above method corresponding to operation of the various embodiments of the apparatus as described and claimed herein are considered within the scope of the present invention.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public

The invention claimed is:

1. A display system (400) for use in a Pepper's Ghost illusion, comprising
    a light emissive display (418);
    a sensor (432, 436) operable to detect a position of an attachment member (200) of a cone (100), relative to the light emissive display; and
    a positioning processor (410) arranged to position images, which have been distorted by an inverse of distortion caused by reflection of light emitted by the light emissive display by the cone, responsive to the detected position of the attachment member relative to the light emissive display, wherein:
    the attachment member is of a known size,
    the sensor comprises a touch surface (432) on the light emissive display (418), and
    the positioning processor is operable to estimate a centroid of the attachment member responsive to touch surface signals when the attachment member is in contact with the touch surface.

2. The display system of claim 1, wherein the display system is adapted to display a target on the light emissive display prior to positioning of the attachment member on the light emissive display.

3. The display system of claim 1, wherein the sensor comprises a camera (436) having a known physical relationship to the light emissive display (418).

4. The display system of claim 3, wherein the positioning processor is operable to estimate a center axis of the cone responsive to at least a partial image of the cone captured by the camera.

5. The display system of claim 1, wherein the sensor comprises a physical engagement detector other than a touch surface.

6. The display system of claim 1, wherein an area of the light emissive display used to display images for reflection by the cone is limited to a circle centered on the cone having a radius equivalent to the distance between the center of the cone and the closest edge of the display.

7. The display system of claim 1, wherein an area of the light emitted display being the part of the display on a longitudinal axis that is closer to a user than the cone is used to display images for reflection.

8. A system for use in a Pepper's Ghost illusion, comprising:
    a display system (400), including:
    a light emissive display (418);
    a sensor (432, 436) operable to detect the position of an attachment member (200) of a cone (100), relative to the light emissive display; and
    a positioning processor (410) arranged to position images, which have been distorted by an inverse of distortion caused by reflection of light emitted by the light emissive display by the cone, responsive to the detected position of the attachment member relative to the light emissive display; and
    the cone (100), comprising a conical wall of semi-reflective material, wherein:
    the cone comprises the attachment member (200) for removably attaching the cone to the surface of a light emissive display (418),
    the attachment member is of a known size,
    the sensor comprises a touch surface (432) on the light emissive display (418), and
    the positioning processor is operable to estimate a centroid of the attachment member responsive to touch surface signals when the attachment member is in contact with the touch surface.

9. The system of claim 8, wherein the attachment member (200) corresponds in shape to a part of the display system and engages with the display system in a predetermined manner that places the cone in an intended location over the display.

10. A method of adjusting a display system for use in a Pepper's Ghost illusion, comprising the steps of:
    detecting a position of an attachment member (200) of a cone (100) relative to a light emissive display via a sensor; and
    positioning images, which have been distorted by an inverse of distortion caused by reflection of light emitted by the light emissive display by the cone, responsive to the detected position of the attachment member relative to the light emissive display, wherein:
    the attachment member is of a known size,
    the sensor comprises a touch surface (432) on a light emissive display (418), and
    the positioning images includes estimating a centroid of the attachment member responsive to touch surface signals when the attachment member is in contact with the touch surface.

11. A method according to claim 10, wherein:
    the step of detecting the position comprises using a sensor operable to detect the position of the attachment member, relative to the light emissive display, and
    the sensor comprises one or more of:
    i. a touch surface on the light emissive display;
    ii. a camera having a known physical relationship to the light emissive display; and
    iii. a physical engagement detector other than a touch surface.

12. A non-transitory, computer readable recording medium having computer executable instructions stored thereon, which when executed by a computer system, cause the computer system to adjust a display system for use in a Pepper's Ghost illusion, by carrying out actions, comprising:
    detecting a position of an attachment member (200) of a cone (100) relative to a light emissive display via a sensor; and
    positioning images, which have been distorted by an inverse of distortion caused by reflection of light emitted by the light emissive display by the cone, responsive to the detected position of the attachment member relative to the light emissive display, wherein:
    the attachment member is of a known size,
    the sensor comprises a touch surface (432) on a light emissive display (418), and the positioning images includes estimating a centroid of the attachment member responsive to touch surface signals when the attachment member is in contact with the touch surface.

* * * * *